United States Patent [19]

Anderson et al.

[11] Patent Number: 5,281,809
[45] Date of Patent: Jan. 25, 1994

[54] METHOD OF OPERATING LIGHT CURTAIN WITH DEACTIVATED ZONE CONTROL

[75] Inventors: E. Peter Anderson, Redwood City; James A. Ashford, San Carlos, both of Calif.; Richard Klass, Stevenville, Mich.

[73] Assignee: Scientific Technologies Incorporated, Hayward, Calif.

[21] Appl. No.: 994,784

[22] Filed: Dec. 22, 1992

Related U.S. Application Data

[62] Division of Ser. No. 843,762, Feb. 28, 1992, Pat. No. 5,198,661.

[51] Int. Cl.[5] .................. G01V 9/04; G08B 13/18
[52] U.S. Cl. ........................... 250/221; 340/556
[58] Field of Search ............. 250/221, 222.1, 223 R, 250/208.2, 208.4, 208.6; 340/555, 556, 557

[56] References Cited

U.S. PATENT DOCUMENTS

| 4,015,122 | 3/1977 | Rubinstein | 250/221 |
| 4,249,074 | 2/1981 | Zettler et al. | 250/221 |
| 4,571,498 | 2/1986 | Hagan et al. | 250/560 |
| 4,645,920 | 2/1987 | Carroll et al. | 250/221 |
| 4,818,866 | 4/1989 | Weber | 250/221 |
| 5,015,840 | 5/1991 | Blau | 250/221 |
| 5,107,253 | 4/1992 | Meadows | 250/221 |

FOREIGN PATENT DOCUMENTS 1208396 1/1986 U.S.S.R. .................. 250/221

Primary Examiner—Michael Messinger
Attorney, Agent, or Firm—Flehr, Hohbach, Test, Albritton & Herbert

[57] ABSTRACT

A method of operation of a light curtain system for sensing the intrusion of objects into detection planes which define a protected zone. A group of light beams are strobed from one transmitter in a first direction across a zone to a receiver, and another group of light beams are strobed from another transmitter across the zone to another receiver. Light beams within each group which intersect a desired entry area are deactivated for penetration of a permitted object, and other beams in the groups are enabled to detect intrusion into the objects in portions of the zone which lie around the entry area.

7 Claims, 4 Drawing Sheets

METHOD OF OPERATING LIGHT CURTAIN WITH DEACTIVATED ZONE CONTROL

This is a division of application Ser. No. 07/843,762 filed Feb. 28, 1992 now U.S. Pat. No. 5,198,661.

FIELD OF THE INVENTION

This invention relates in general to light curtains which detect the intrusion of human limbs or other objects into a protected zone for triggering alarms, shutting off machinery or otherwise responding to safeguard the zone.

BACKGROUND OF THE INVENTION

Light curtains are commonly employed in a variety of industrial applications to detect the intrusion of objects, such as hands or feet of personnel, into or around a prescribed area or zone of protection. Typical applications for light curtains include provide operator protection around machinery such punch presses, brakes, molding machines, automatic assembly equipment, coil winding machinery, robot operation, casting operations and the like. Conventional light curtain systems employ invisible pulsed infrared light beams which project across a plane along the zone to be protected. Unintended intrusion of the light beams by an object, such as the operator's hand, is sensed so that a control circuit triggers a warning signal, shuts the machinery down, or otherwise safeguards the area.

Heretofore light curtain systems have been provided with transmitter and receiver heads arranged to pulse the beams across a single plane.

The heads are typically mounted so that the plane is positioned between the human operator and the machine, such as in the front of a punch press. Additional light curtain systems with separate transmitter and receiver heads are required where it is desired to provide protection to other areas of the machine, such as along either or both sides. Because light curtain systems are expensive, this leads to increased cost of the installation.

In certain cases it has been found that machine operators, in an effort to increase their productivity, attempt to foil the protection of the light curtains. For example, in the case of a single light curtain projected in a vertical plane between the operator and machine, the operator may attempt to reach under or around the plane of the curtain to feed the work pieces at a greater rate through the machine. With the light curtain system foiled in this manner, serious injury can result.

Certain light curtains heretofore available have included control systems by which selected beams can be electronically disabled to permit the sensing area to be penetrated by expected tooling or work pieces. An example is a metal forming machine in which the formed work piece is fed from the machine out through an electronically masked-off portion of the sensing area. The remaining portion of the sensing area continues to operate for sensing intrusion of the operator's hands or other objects. However, in these conventional systems there are shadows of unprotected areas on opposite sides of the masked-off portion of the curtain. As a result, injury or damage can occur from intrusion of a hand or other object into the unprotected area.

OBJECTS OF THE INVENTION

Accordingly, it is the principal object of the present invention to provide an improved light curtain system by which a work area or other zone can be protected on a plurality of sides with greater flexibility in orientation of the different detection planes.

Another object is to provide a light curtain method of operation of the type described by which the work place area can be protected in a manner which deters any attempts by the operator to foil the protection system.

Another object is to provide a light curtain method of the type described in which portions of the sensing area can be selectively masked off for penetration of desired tooling or work pieces, and which does not create shadows of unprotected areas on opposite sides of the penetration area.

SUMMARY OF THE INVENTION

The invention in summary provides a light curtain method of operation which includes a plurality of light curtain segments, each of which includes spaced-apart transmitter and receiver heads. Light beams are sequentially pulsed from the transmitter heads across detection planes to the respective receiver heads. Connection means is provided for connecting the transmitter heads in series and also for connecting the receiver heads in series so that the concatenated segments operate in the manner of a single light curtain. The invention provides a method of operation by which selected beams can be electronically masked off to permit the expected penetration of objects into an entry area of the plane, the segments are arranged so that shadows of unprotected areas are not cast on opposite sides of the entry area.

The foregoing and additional objects and features of the invention will appear from the following specification in which the several embodiments have been set forth in conjunction with the accompanying drawings.

DESCRIPTION OF THE PREFERRED EMBODIMENTS

Figure 1:
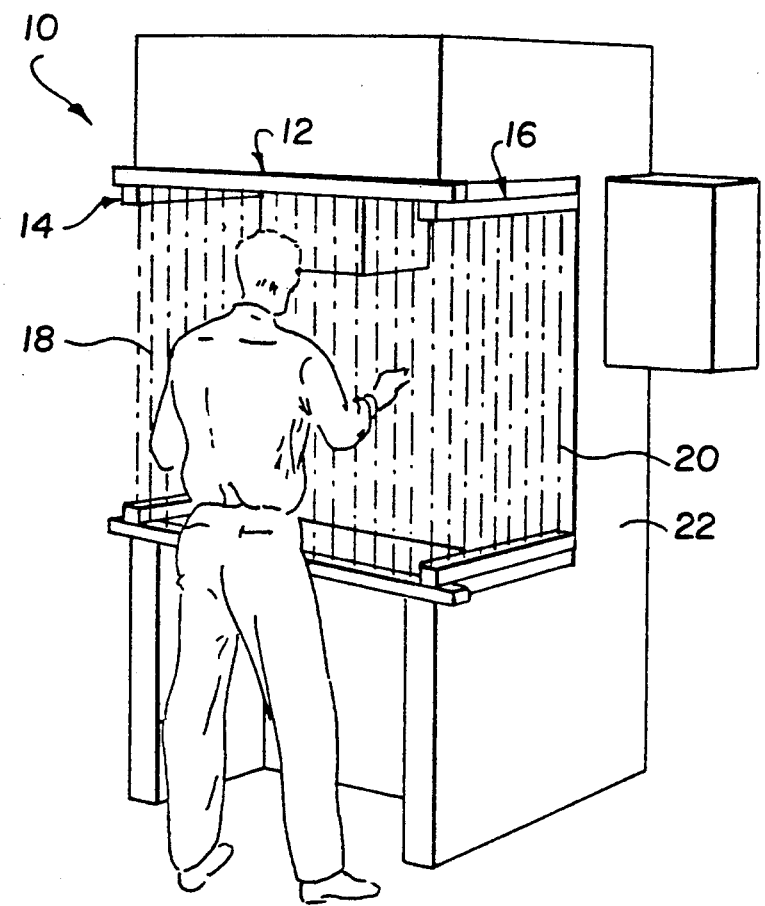
FIG. 1 is a perspective view illustrating one embodiment of the light curtain system showing the method of operation.
Figure 2:
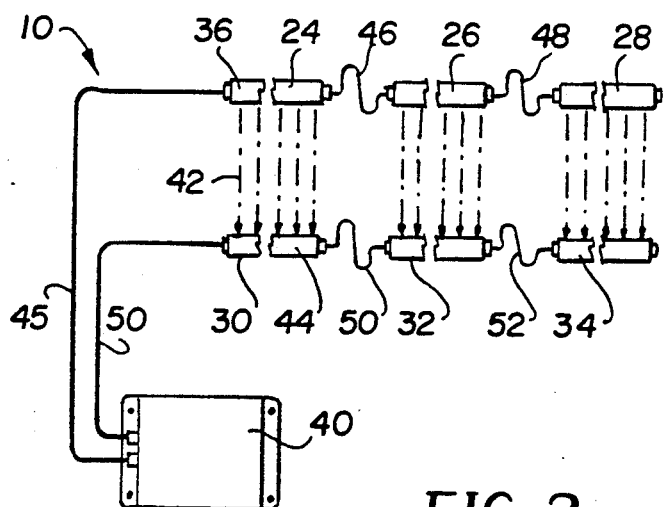
FIG. 2 is a side developmental view, partially broken away, illustrating the arrangement for connecting the light curtain segments for the system of FIG. 1.
Figure 3:
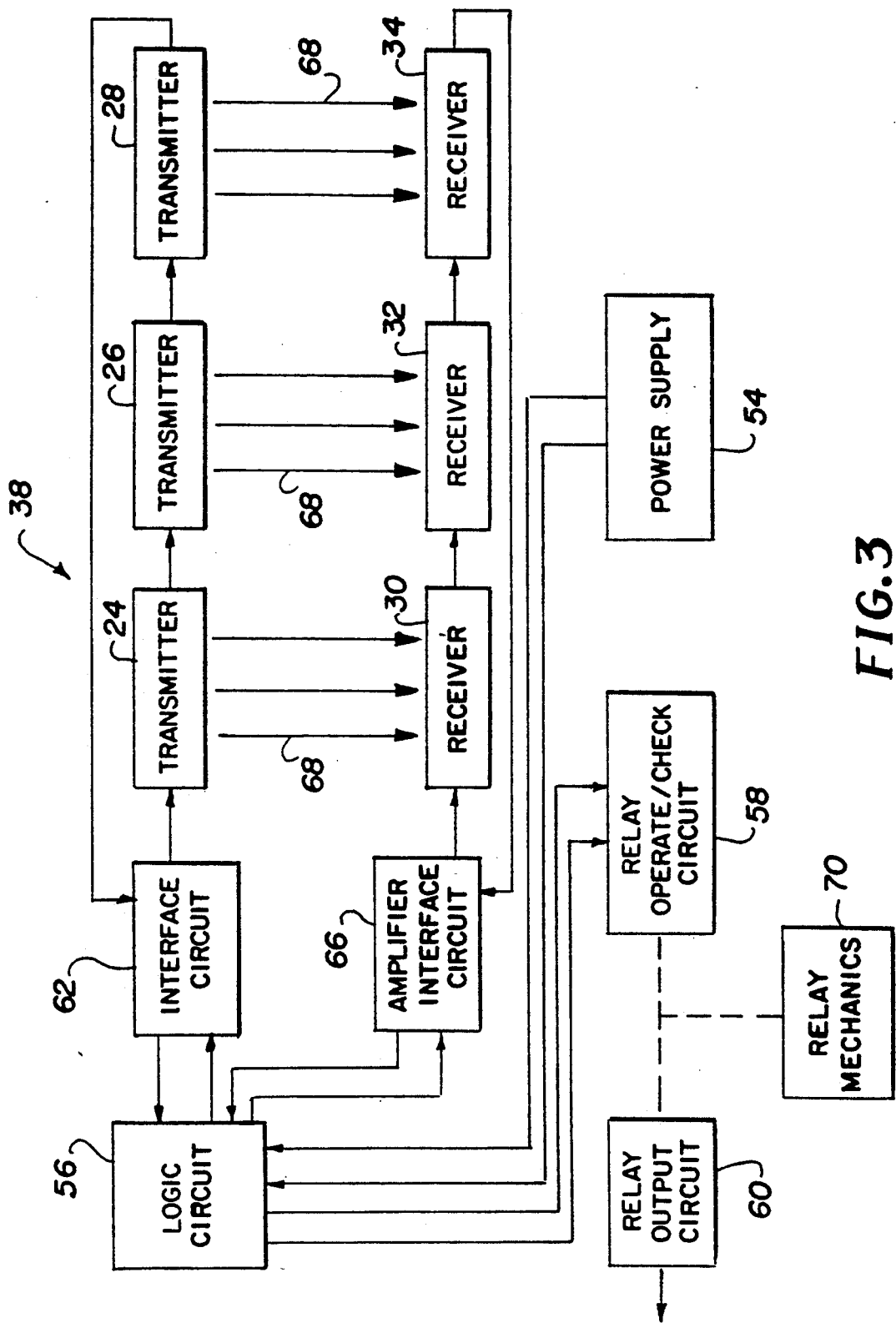
FIG. 3 is a schematic block diagram illustrating the major components of the electrical control system for the light curtain system of FIGS. 1 and 2.

In the drawings FIGS. 1-3 illustrate a light curtain system 10 incorporating one embodiment of the invention. The light curtain system is comprised of three light curtain segments 12, 14 and 16. The segments are positioned so that their detection planes 18, 20 are aligned in a U-shaped orientation with a zone of protection defined between the operator and front and side portions of the machine. In the illustrated example for this embodiment the machine is a punch press 22, and it is understood that the U-shaped protection zone of this embodiment will have application for other machinery.

As best shown in FIG. 2, the light curtain segments are comprised of respective transmitter heads 24, 26, 28 and receiver heads 30, 32, 34. The transmitter head of the typical segment 12 includes an elongate housing 36 which carries a plurality of light sources, preferably light-emitting diodes (LEDs) (not shown). The LEDs emit pulses of infrared light responsive to the control circuit 38 of FIG. 3, which is contained in a box 40. Collimating lenses, not shown, focus light beams from the LEDs into beams which project along predetermined paths or channels 42 across the zone of the workplace which is to be protected. In the illustrated embodiment the light beams are projected in spaced-apart parallel vertical channels.

The receiver head 30 of the typical segment 12 includes an elongate housing 44 which carries a plurality of phototransistors (PTs) (not shown), which are equal in number to the number of light transmitting LEDs in the segment. Each PT is associated with the LED of a respective channel. The transmitter and receiver heads are oriented at the workplace so that the PTs are substantially in optical alignment with the light beams from the LEDs.

While operation of the invention will be described in connection with the use of infrared light, it is understood that the invention contemplates the use of other radiant energy, for example near-infrared or visible light.

The schematic of FIG. 2 illustrates the means for flexibly interconnecting the light curtain segments with the control circuit 38. The transmitter control and power lines lead from the circuit within box 40 through a cable 45 to the first transmitter head 24 for feeding the LEDs which it contains. The control and power supply lines continue through a flexible cable 46 which interconnects with second transmitter head 26. The lines continue through a second flexible cable 48 which connects with third transmitter head 28. The receiver control and power lines lead from the circuit through another cable 50 into the first receiver head 30 where the lines connect with the first set of PTs. The lines continue through a flexible cable 50 which interconnects with second receiver head 32, and then through a third cable 52 which interconnects with third receiver head 34. In the illustrated embodiment the transmitter heads are located atop the receiver heads with the light beams transmitted vertically downwardly. As desired, the heads could be reversed with the light beams transmitted upwardly. Preferably, the flexible cables interconnecting the transmitter and receiver heads are of the plug-in type so that the installation can be tailored to a particular workplace environment. For example, the light curtain components can be shipped to the end user who can then mount and couple together the segments in the desired angular orientation to match the configuration of the particular machine or equipment around which the protection zone is to be established.

FIG. 3 illustrates the major components of control circuit 38 in block diagram form. The circuit includes a power supply 54, logic circuit 56, relay operate/check circuit 58, relay output circuit 60, interface circuit 62 which interconnects the logic circuit with the transmitter heads 24-28, and amplifier interface circuit 66 which interconnects the logic circuit with receiver heads 30-34. The lines 68 represent the paths of the light beams which project across the detection planes from the transmitter LEDs to the receiver PTs. Details of the control circuit components and mode of operation of the circuit can advantageously be as described in U.S. Pat. No. 5,015,840, which is assigned to the assignee of the present invention.

With control circuit 38 in operation, the LEDs in each transmitter head strobe infrared light beams along parallel channels to the respective PTs in the receiver heads. The logic circuit operates as described in U.S. Pat. No. 5,015,840 to activate the LEDs in sequence and strobe the beams so that they are addressed exclusively for given channels. When the beams in one or more channels are interrupted, such as due to intrusion of the operator's arm into the detection plane, the circuit senses that the beam is not present at the PTs in those channels at the proper time in the sequence. The circuit then generates a shutdown signal which is directed to the relay drivers depicted by the box 70. The relays in turn operate either to shut the machinery down, activate an alarm, or otherwise safeguard the area as required by the particular installation.

Figure 4:
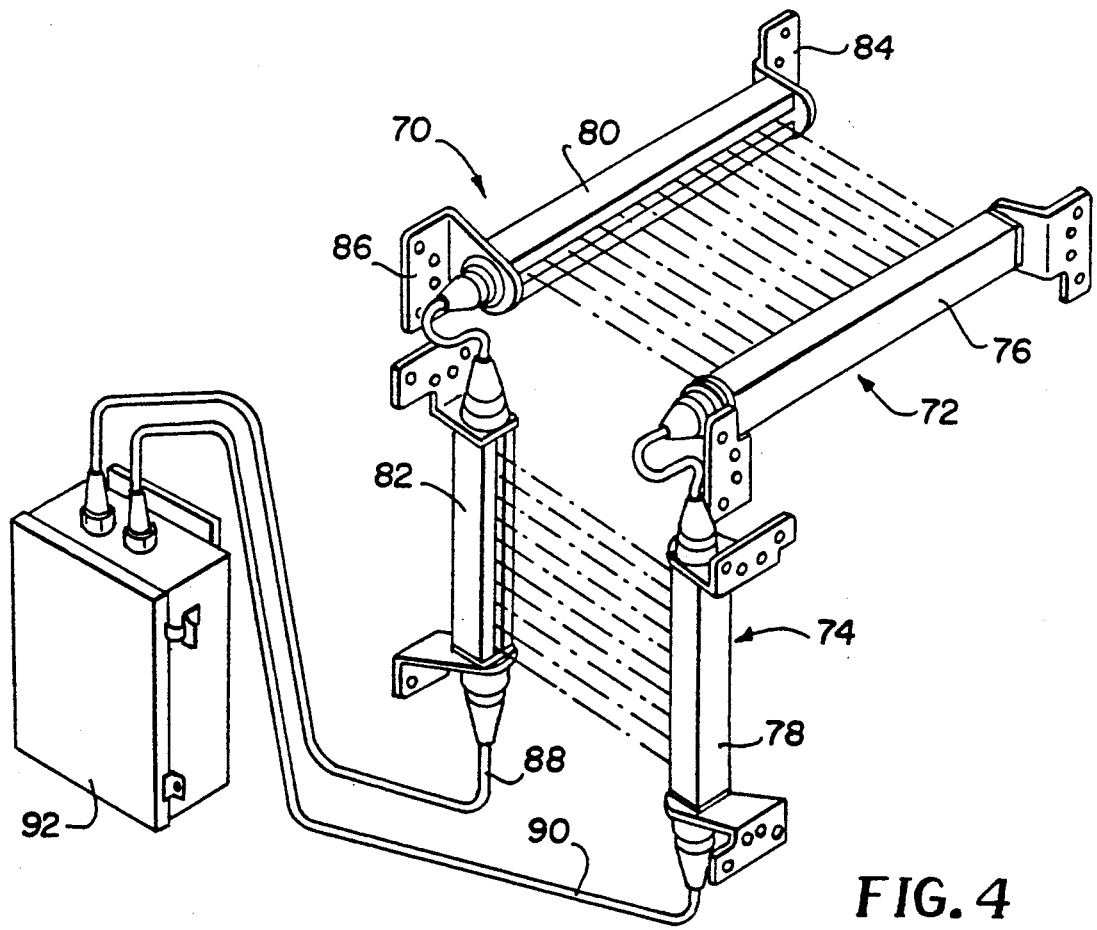
FIG. 4 is a perspective view illustrating the light curtain system according to another embodiment of the invention.

FIG. 4 illustrates another embodiment providing a system 70 having two light curtain segments 72 and 74 arranged in an L-shaped angular orientation. The segments are comprised of respective transmitter heads 76, 78 and receiver heads 80, 82. The transmitter heads include housings which supports LEDs and focusing lenses, not shown, arrayed along linear paths. The receiver heads include housings which support PTs which correspond to the LEDs of the opposing transmitter heads. Brackets 84, 86 are provided on the housing ends for mounting the segments in desired orientation. Cables 88, 90 connect the input ends of the respective transmitted and receivers heads to the controller and power supply circuit in box 92. Flexible plug-in cables 94, 96 connect the respective transmitter and receiver head together to operate in the circuit.

Figure 5:
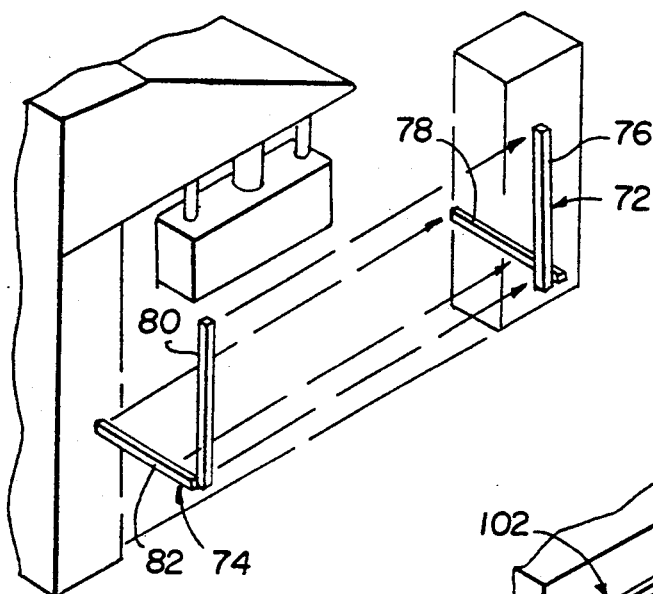
FIG. 5 is a perspective view illustrating the light curtain system according to another embodiment of the invention.

FIG. 5 illustrates in perspective view one specific application of the L-shaped orientation of the two segment light curtain system of FIG. 4. The first segment 72 comprising transmitter head 80 and receiver head 76 is mounted so that its detection plane is positioned upright between the machinery, shown as a punch press, with the operator standing in front. The second segment 74 is mounted with transmitter head 82 and receiver head 78 horizontal so that its detection plane extends toward the machinery from the lower edge of the detection plane of the first segment.

In operation of the embodiment of FIG. 5, the operator is protected by the vertical detection plane of the first segment should the operator's hand or any other object penetrate the plane. Additional protection is provided by the horizontal plane of the second segment should the operator attempt to position his or her body between the vertical plane and the machinery. This combination has particular application in those cases where the operator may attempt to circumvent the protection of the vertical plane in an effort to increase productivity, such as by attempting to feed work pieces at a greater rate through the machine.

Figure 6:
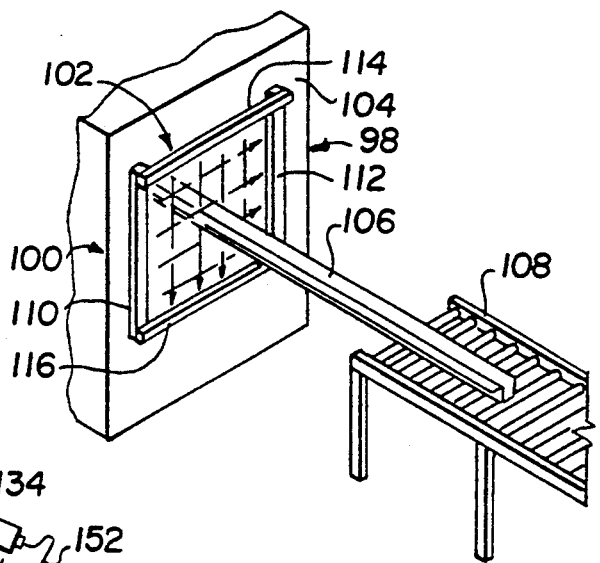
FIG. 6 is a perspective view illustrating the light curtain system according to another embodiment of the invention.

FIG. 6 illustrates another embodiment providing a system 98 with two light curtain segments 100 and 102 arranged in a rectangular or "picture frame" orientation in which the light beam channels of the two segments are substantially orthogonal to one another, although the channels could be oriented at an acute angle. The system of this embodiment is particularly adapted for applications in which sets of beams are deactivated to permit expected penetration through the detection planes of tooling, work pieces or other objects. The application for the illustrated embodiment is a metal forming machine 104 in which a formed metal work piece 106 is moved out from an opening in the machine through the detection plane and onto a conveyor 108.

First light curtain segment 100 is comprised of respective transmitter and receiver heads 110 and 112 which are mounted upright on opposite sides of the machine opening, with the light beam channels extending horizontally to form one detection plane. The second light curtain segment 102 has its transmitter and receiver heads 114 and 116 mounted horizontally across the top and bottom sides of the machine opening with the light beam channels extending vertically. The detection planes of the two segments can be closely spaced apart, although this is not critical. A controller and power supply circuit, not shown, similar to that described for the embodiment of FIGS. 1-3 is provided, with the respective transmitter and receiver heads connected through flexible cables, also not shown.

In the operation of the embodiment of FIG. 6 the group of horizontal light beam channels of the first segment 100 which would otherwise cross the vertical height of the work piece are selectively deactivated by an appropriate setting of the control circuit. Similarly, the group of vertical channels of the second segment 102 which would otherwise cross the horizontal width of the work piece are selectively deactivated in the circuit. This results in a rectangular entry area, which can be in the center of the machine opening, through which the formed metal work piece 106 or other object can penetrate without triggering the detection circuit. At the same time, the remaining area of the detection planes outside the entry area are not masked off and remain active for detecting any unintended intrusion of the operator's hand or other object. Thus, while the portions of the horizontal channels of the first segment which lie between the work piece and transmitter and receiver heads are masked off by the work piece, the overlapping beams in the vertical channels of the second segment remain active to protect that part of the zone. Similarly, while portions of the beams of the vertical channels are masked off by the work piece, that area remains protected by the overlapping horizontal channels of the first segment.

Figure 7:
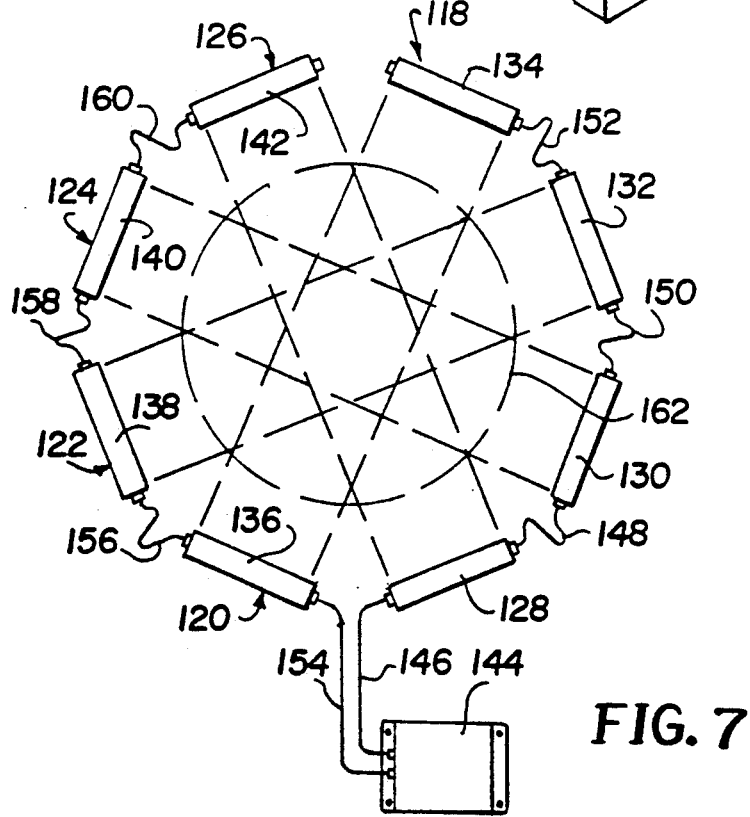
FIG. 7 is a plan view illustrating a light curtain system according to another embodiment of the invention.

FIG. 7 illustrates another embodiment providing a light curtain system 118 having transmitter and receiver heads arrayed about a common center 119 so that their light beams substantially overlap and form a detection zone about the center. The system includes a plurality, shown as four, of light beam segments 120-126 which comprise respective transmitter heads 128-134 and receiver heads 136-142. In the illustrated embodiment the transmitter and receiver heads are positioned as chords of a circle, with the transmitter heads on one side of the circle and the receiver heads aligned on the opposing side. As required by the particular application, the heads could be arrayed about an oval or other path about the common center.

In the embodiment of FIG. 7 box 144 encloses a controller and power supply circuit, which preferably is similar to that described for the embodiment of FIGS. 1-3. The circuit connects through a cable 146 with first transmitter head 128, and the remaining transmitter heads are interconnected by flexible plug-in cables 148-152. Cable 154 from the control circuit connects with the first receiver head 136, and the remaining receiver heads are interconnected through flexible plug-in cables 156-160. The control lines in the cables are arranged so that the transmitter and receiver heads which are mounted diametrically opposite each other operate together as a single light curtain segment. As shown in FIG. 7, the paths of the light curtains from the four segments intersect over the common center, with the circle shown by the broken line 162 forming a complete protected zone. The size of the protected zone would vary depending upon the width of the light curtains of each segment.

While the foregoing embodiments are at present considered to be preferred, it is understood that numerous variations and modifications may be made therein by those skilled in the art and it is intended to cover in the appended claims all such variations and modifications as fall within the true spirit and scope of the invention.

What is claimed is:

1. A method of operating a light curtain system having at least two light curtain segments with each segment having a transmitter for strobing a plurality of light beams along channels to a receiver for detecting the intrusion of human limbs or other objects into one or more detection planes which define a protected zone, comprising the steps of strobing light beams from the transmitter in one of the segments along channels which extend in a first direction, strobing light beams from the transmitter in another of the segments along channels which extend in a second direction at a given angle with the first direction, deactivating selected beams in each transmitter of said two segments along channels which substantially intersect an entry area into which an object is permitted to penetrate, and enabling the receivers to detect the intrusion of said limbs or objects into portions of the detection planes lying outside said entry area.

2. The method of claim 1 including the step of holding the light curtain segments at orientations where said given angle between the first and second directions of the respective light beams is substantially a right angle.

3. The method of claim 1 including the step of holding the segments at orientations where the respective channels of their light beams substantially intersect.

4. A method as in claim 1 in which said step of enabling the receivers comprises directing a first group of active light beams along channels that parallel said selected beams which are deactivated in one of said segments, and directing a second group of active light beams along channels that parallel said selected beams which are deactivated in another of said segments, and orienting said light curtain segments so that the first and second groups of beams optically overlap generally in the direction along which said object is permitted to penetrate whereby shadows of unprotected areas are not cast on opposite sides of said entry area.

5. A method as in claim 4 in which said first and second groups of active light beams are directed along channels which are oriented substantially orthogonal.

6. A method as in claim 4 in which first group of active light beams is directed substantially horizontal, and said second group of active light beams is directed substantially vertically.

7. A method of operating a light curtain system which includes transmitter means for transmitting a plurality of light beams along channels to receiver means for detecting the intrusion of human limbs or other objects into one or more detection planes which define a protected zone, the method comprising the steps strobing light beams from the transmitter means in a first direction across the protected zone to the receiver means, strobing light beams from the transmitter means in a second direction across the protected zone to the receiver means with the second direction subtending a given angle relative to the first direction, deactivating selected beams of those which extend in the first direction and which substantially intersect an entry area into which an object is permitted to penetrate, deactivating selected beams of those which extend in the second direction and which substantially intersect said entry area, and enabling the receiver means to detect the intrusion of limbs or objects into the portion of the detection planes which lie outside said entry area.

* * * * *